United States Patent
Waddell

(10) Patent No.: US 11,695,259 B2
(45) Date of Patent: Jul. 4, 2023

(54) MODULAR ION GENERATOR DEVICE

(71) Applicant: Global Plasma Solutions, Inc., Charlotte, NC (US)

(72) Inventor: Charles Houston Waddell, Roanoke, VA (US)

(73) Assignee: GLOBAL PLASMA SOLUTIONS, INC., Charlotte, NC (US)

( * ) Notice: Subject to any disclaimer, the term of this patent is extended or adjusted under 35 U.S.C. 154(b) by 0 days.

(21) Appl. No.: 17/026,888

(22) Filed: Sep. 21, 2020

(65) Prior Publication Data

US 2022/0094142 A1    Mar. 24, 2022
US 2022/0416518 A9    Dec. 29, 2022

Related U.S. Application Data

(63) Continuation-in-part of application No. 16/751,717, filed on Jan. 24, 2020, now Pat. No. 11,283,245,
(Continued)

(51) Int. Cl.
   *H01T 23/00* (2006.01)
   *G21K 5/02* (2006.01)

(52) U.S. Cl.
   CPC .............. *H01T 23/00* (2013.01); *G21K 5/02* (2013.01)

(58) Field of Classification Search
   CPC ......... H01T 23/00; H01T 19/04; H01T 19/00; G21K 5/02; H01J 27/02; H01J 49/10; H01J 37/08; H01J 45/00; H01J 2237/06308; H01J 2237/08; H01J 2237/0802; H01J 2237/0822
(Continued)

(56) References Cited

U.S. PATENT DOCUMENTS 1,811,687 A    6/1931   Philip et al.
3,624,448 A    11/1971  Saurenman
(Continued)

FOREIGN PATENT DOCUMENTS

AU    2014214642 A1    8/2015
CA    2108790 A1       4/1995
(Continued)

OTHER PUBLICATIONS

Pushpawala Buddhi, et al., "Efficiency of Ionizers in Removing Airborne Particles in Indoor Environments." Journal of Electrostatics, vol. 90, pp. 79-84, Dec. 2017.
(Continued)

*Primary Examiner* — Jason L McCormack
(74) *Attorney, Agent, or Firm* — Seth L. Hudson; Maynard Nexsen PC

(57) ABSTRACT

The present invention provides methods and systems for a modular ion generator device that includes a bottom portion, two opposed side portions, a front end, a back end, and a top portion. A cavity is formed within the two opposed side portions, front end, back end, and top portion. At least one electrode is positioned within the cavity, and an engagement device is engaged to the front end and/or an engagement device engaged to the back end for allowing one or more modular ion generator devices to be selectively secured to one another.

14 Claims, 12 Drawing Sheets

Related U.S. Application Data which is a continuation-in-part of application No. 16/003,327, filed on Jun. 8, 2018, now Pat. No. 10,566,769, which is a continuation of application No. 15/670,219, filed on Aug. 7, 2017, now Pat. No. 10,020,180.

(60) Provisional application No. 62/372,053, filed on Aug. 8, 2016.

(58) Field of Classification Search
USPC .................................. 250/423 R, 424, 423 F
See application file for complete search history.

(56) References Cited

U.S. PATENT DOCUMENTS

| | | | |
|---|---|---|---|
| 3,652,897 A | 3/1972 | Iosue et al. |
| 3,769,695 A | 11/1973 | Price et al. |
| 3,968,405 A | 7/1976 | Testone |
| 4,031,599 A | 6/1977 | Testone |
| 4,117,326 A | 9/1978 | Askman |
| D253,281 S | 10/1979 | Kim |
| 4,216,518 A | 8/1980 | Simons |
| 4,263,636 A | 4/1981 | Testone |
| 4,264,343 A | 4/1981 | Natarajan et al. |
| 4,284,420 A | 8/1981 | Borysiak |
| D286,765 S | 11/1986 | Prouty et al. |
| 4,734,580 A | 3/1988 | Rodrigo et al. |
| 4,757,422 A | 7/1988 | Bossard et al. |
| 4,809,127 A | 2/1989 | Steinman et al. |
| 4,829,398 A | 5/1989 | Wilson |
| 5,034,651 A | 7/1991 | Domschat |
| 5,084,077 A | 1/1992 | Junker et al. |
| D332,942 S | 2/1993 | Julien |
| D353,575 S | 12/1994 | Macomber |
| 5,464,754 A | 11/1995 | Dennis et al. |
| 5,492,557 A | 2/1996 | Vanella |
| 5,653,638 A | 8/1997 | Nagata |
| 5,737,176 A | 4/1998 | Muz |
| 5,741,352 A | 4/1998 | Ford et al. |
| 5,768,087 A | 6/1998 | Vernitskiy |
| 5,879,435 A | 3/1999 | Satyapal et al. |
| 5,931,989 A | 8/1999 | Knutsson |
| 6,019,815 A | 2/2000 | Satyapal et al. |
| 6,118,645 A | 9/2000 | Partridge |
| D434,523 S | 11/2000 | Ford |
| 6,156,099 A | 12/2000 | Hironaka et al. |
| D443,587 S | 6/2001 | Sakasegawa |
| 6,252,756 B1 | 6/2001 | Richie, Jr. |
| 6,330,146 B1 | 12/2001 | Blitshteyn |
| 6,350,417 B1 | 2/2002 | Lau et al. |
| 6,417,581 B2 | 7/2002 | Hall |
| 6,544,485 B1 | 4/2003 | Taylor |
| D476,298 S | 6/2003 | Lee |
| 6,576,046 B2 | 6/2003 | Pruette |
| 6,653,638 B2 | 11/2003 | Fujii |
| 6,680,033 B2 | 1/2004 | Ishii |
| 6,744,611 B2 | 6/2004 | Yang et al. |
| 6,744,617 B2 | 6/2004 | Fujii |
| 6,791,814 B2 | 9/2004 | Adachi et al. |
| 6,850,403 B1 | 2/2005 | Gefter et al. |
| 6,855,190 B1 | 2/2005 | Nikkhah |
| 6,902,392 B2 | 6/2005 | Johnson |
| D533,832 S | 12/2006 | Hock |
| 7,177,133 B2 | 2/2007 | Riskin |
| 7,244,289 B2 | 7/2007 | Su |
| 7,256,979 B2 | 8/2007 | Sekoguchi et al. |
| 7,273,515 B2 | 9/2007 | Yuen |
| 7,408,759 B2 | 8/2008 | Gefter et al. |
| D587,198 S | 2/2009 | Nagasawa |
| 7,492,568 B2 | 2/2009 | Takayanagi |
| 7,497,898 B2 | 3/2009 | Sato et al. |
| 7,639,472 B2 | 12/2009 | Sekoguchi et al. |
| 7,716,772 B2 | 5/2010 | Shih et al. |
| 7,739,771 B2 | 6/2010 | Powell, Jr. |
| 7,764,482 B2 | 7/2010 | Lee et al. |
| 7,824,477 B2 | 11/2010 | Kang et al. |
| 7,916,445 B2 | 3/2011 | Sekoguchi et al. |
| 7,940,509 B2 | 5/2011 | Orihara et al. |
| 7,948,733 B2 | 5/2011 | Hashimoto |
| 7,961,451 B2 | 6/2011 | Sekoguchi et al. |
| 7,969,707 B2 | 6/2011 | Riskin |
| 7,995,321 B2 | 8/2011 | Shimada |
| 8,043,573 B2 | 10/2011 | Parker et al. |
| 8,053,741 B2 | 11/2011 | Sekoguchi |
| 8,106,367 B2 | 1/2012 | Riskin |
| 8,134,821 B2 | 3/2012 | Fukai |
| 8,328,902 B2 | 12/2012 | Boyden et al. |
| 8,351,168 B2 | 1/2013 | Sicard |
| 8,425,658 B2 | 4/2013 | Lee |
| 8,554,924 B2 | 10/2013 | Holden et al. |
| 8,710,455 B2 | 4/2014 | Shiozawa |
| 8,710,456 B2 | 4/2014 | Klochkov |
| 8,724,286 B2 | 5/2014 | Uchida et al. |
| 8,951,024 B2 | 2/2015 | Ishii et al. |
| 8,957,571 B2 | 2/2015 | Riskin |
| 9,293,895 B2 | 3/2016 | Pucciani |
| D754,314 S | 4/2016 | Ellis et al. |
| 9,579,664 B2 | 2/2017 | Marra |
| 9,623,422 B2 | 4/2017 | Overdahl |
| 9,630,185 B1 | 4/2017 | Riskin |
| 9,630,186 B2 | 4/2017 | Back |
| 9,660,425 B1 | 5/2017 | Sunshine |
| 9,661,725 B2 | 5/2017 | Gefter et al. |
| 9,661,727 B2 | 5/2017 | Gefter et al. |
| 9,847,623 B2 | 12/2017 | Sunshine |
| 9,849,208 B2 | 12/2017 | Waddell |
| 9,859,090 B2 | 1/2018 | Gefter |
| 9,948,071 B2 | 4/2018 | Chen et al. |
| 9,985,421 B2 | 5/2018 | Sunshine |
| 10,020,180 B2 | 7/2018 | Waddell |
| 10,116,124 B2 | 10/2018 | Sung et al. |
| 10,153,623 B2 | 12/2018 | Sunshine |
| 10,258,922 B2 | 4/2019 | Hsieh |
| D848,945 S | 5/2019 | Lin |
| 10,297,984 B2 | 5/2019 | Sunshine |
| 10,322,205 B2 | 6/2019 | Waddell |
| 10,439,370 B2 | 10/2019 | Sunshine |
| 10,492,285 B2 | 11/2019 | Lee et al. |
| 10,566,769 B2 | 2/2020 | Waddell |
| 10,695,455 B2 | 6/2020 | Waddell |
| 10,710,098 B2 | 7/2020 | Marra |
| 10,737,279 B2 | 8/2020 | Gefter et al. |
| 10,758,947 B2 | 9/2020 | Heymann et al. |
| 10,786,818 B2 | 9/2020 | Galbreath et al. |
| 10,980,911 B2 | 4/2021 | Waddell |
| 11,283,245 B2 | 3/2022 | Waddell |
| 2003/0072697 A1 | 4/2003 | Taylor |
| 2003/0147783 A1 | 8/2003 | Taylor |
| 2006/0193100 A1 | 8/2006 | Izaki et al. |
| 2007/0253860 A1 | 11/2007 | Schroder |
| 2008/0130190 A1* | 6/2008 | Shimada ................. H01T 23/00 361/231 |
| 2008/0160904 A1 | 7/2008 | Yi et al. |
| 2009/0052108 A1 | 2/2009 | Innami |
| 2009/0211459 A1 | 8/2009 | Hu et al. |
| 2010/0157503 A1 | 6/2010 | Saito et al. |
| 2010/0172808 A1 | 7/2010 | Igarashi |
| 2010/0175391 A1 | 7/2010 | Jee et al. |
| 2012/0068082 A1 | 3/2012 | Noda |
| 2012/0154973 A1 | 6/2012 | Vaynerman et al. |
| 2013/0214173 A1* | 8/2013 | Noda ...................... H01T 23/00 250/423 R |
| 2014/0076162 A1 | 3/2014 | Waddell et al. |
| 2014/0078639 A1 | 3/2014 | Waddell et al. |
| 2014/0103793 A1 | 4/2014 | Nishida et al. |
| 2014/0147333 A1 | 5/2014 | Morfill |
| 2014/0233232 A1 | 8/2014 | Radermacher |
| 2015/0255961 A1 | 9/2015 | Chen et al. |
| 2016/0167059 A1 | 6/2016 | Waddell |
| 2016/0175852 A1 | 6/2016 | Waddell |
| 2016/0190772 A1* | 6/2016 | Sunshine ................. H01T 23/00 361/231 |
| 2017/0040149 A1 | 2/2017 | Waddell |

(56) References Cited

U.S. PATENT DOCUMENTS

| | | |
|---|---|---|
| 2017/0232131 A1 | 8/2017 | Waddell |
| 2017/0274113 A1 | 9/2017 | Takasahara et al. |
| 2018/0040466 A1 | 2/2018 | Waddell |
| 2018/0071426 A1 | 3/2018 | Waddell |
| 2018/0169711 A1 | 6/2018 | Waddell |
| 2019/0353359 A1 | 11/2019 | Seibold |
| 2020/0161839 A1 | 5/2020 | Waddell |
| 2020/0388994 A1 | 12/2020 | Waddell |

FOREIGN PATENT DOCUMENTS

| | | |
|---|---|---|
| CN | 107138028 A | 9/2017 |
| CN | 111228535 A | 6/2020 |
| DE | 3735219 A1 | 4/1989 |
| DE | 10355834 A1 | 7/2005 |
| DE | 202006006549 U1 | 8/2007 |
| DE | 102009035066 A1 | 3/2010 |
| DE | 102008062415 A1 | 7/2010 |
| DE | 202020102021 U1 | 4/2020 |
| EP | 0919287 A2 | 6/1999 |
| EP | 1878506 A2 | 1/2008 |
| EP | 2336665 A1 | 6/2011 |
| EP | 2683042 A2 | 1/2014 |
| EP | 2411058 B1 | 5/2015 |
| EP | 2905036 A1 | 8/2015 |
| EP | 3093564 A1 | 11/2016 |
| EP | 3165833 A1 | 5/2017 |
| EP | 3346560 A1 | 7/2018 |
| FR | 1494344 A | 9/1967 |
| GB | 1356211 A | 6/1974 |
| GB | 2117676 A | 10/1983 |
| GB | 2117676 A | 10/1983 |
| GB | 2245200 A | 1/1992 |
| GB | 2301179 A | 11/1996 |
| GB | 2377660 A | 1/2003 |
| GB | 2415774 A | 1/2006 |
| GB | 2525280 A | 10/2015 |
| GB | 2529173 A | 2/2016 |
| JP | 2681623 B2 | 11/1997 |
| JP | 2002043092 A | 2/2002 |
| JP | 2004006152 A | 1/2004 |
| JP | 2007141692 A † | 6/2007 |
| JP | 2009043580 A | 2/2009 |
| JP | 1778289 B2 | 9/2011 |
| JP | 5094492 B2 | 12/2012 |
| JP | 2017098139 A | 6/2017 |
| KR | 100776572 B1 | 11/2007 |
| KR | 101589055 B1 | 1/2016 |
| KR | 20160138931 A | 12/2016 |
| KR | 101800326 B1 | 12/2017 |
| KR | 101816255 B1 | 1/2018 |
| WO | WO-8700089 A1 | 1/1987 |
| WO | WO-9820288 A1 | 5/1998 |
| WO | 2006039147 A2 | 4/2006 |
| WO | 2007009336 A1 | 1/2007 |
| WO | WO-2007131981 A1 | 11/2007 |
| WO | WO-2010014654 A1 | 2/2010 |
| WO | 2010074654 A1 | 7/2010 |
| WO | 2011136735 A1 | 11/2011 |
| WO | WO-2012176099 A1 | 12/2012 |
| WO | WO-2013173528 A1 | 11/2013 |
| WO | 2014047445 A1 | 3/2014 |
| WO | WO-2015052557 A1 | 4/2015 |
| WO | WO-2015101348 A1 | 7/2015 |
| WO | WO-2015111853 A1 | 7/2015 |
| WO | 2015138802 A1 | 9/2015 |
| WO | 2016000411 A1 | 1/2016 |
| WO | WO-2016082730 A1 | 6/2016 |
| WO | 2016134204 A1 | 8/2016 |
| WO | WO-2016147127 A1 | 9/2016 |
| WO | 2016204688 A1 | 12/2016 |
| WO | 2017022255 A1 | 2/2017 |
| WO | WO-2017067341 A1 | 4/2017 |
| WO | 2017085954 A1 | 5/2017 |
| WO | 2017152693 A1 | 9/2017 |
| WO | 2017155458 A1 | 9/2017 |
| WO | 2017168800 A1 | 10/2017 |
| WO | WO-2018175828 A1 | 9/2018 |
| WO | WO-2018189924 A1 | 10/2018 |
| WO | 2018234633 A1 | 12/2018 |
| WO | WO-2019000694 A1 | 1/2019 |
| WO | 2019108898 A1 | 6/2019 |
| WO | WO-2020037851 A1 | 2/2020 |
| WO | WO-2020056855 A1 | 3/2020 |
| WO | WO-2020078284 A1 | 4/2020 |
| WO | 2020158967 A1 | 8/2020 |
| WO | 2020186576 A1 | 9/2020 |
| WO | 2020218247 A1 | 10/2020 |

OTHER PUBLICATIONS

Wang, Wei, et al., "Assessment of Indoor Air Quality Using Different Air-Condition for Cooling." Advanced Materials Research, vol. 518-523, pp. 910-913, May 2012.

Wang, Yun Han, et al., "Research Progress of Air Purifier Principles and Material Technologies." Advanced Materials Research, vol. 1092-1093, pp. 1025-1028, Mar. 2015.

K. Nishikawa and H. Nojima, "Air purification technology by means of cluster ions generated by discharge plasma at atmospheric pressure." The 30th International Conference on Plasma Science, 2003. ICOPS 2003. IEEE Conference Record—Abstracts, pp. 379-, 2003.

Airmaid by Interzon product brochure; Sep. 2016; Interzon AB,Propellervagen 4A,SE-183 62 Taby, Sweden www.airmaid.com. 2 pages.

Extended European Search Report dated Sep. 28, 2021, in European Application No. 19750315.4, 60 pages.

Global Plasma Solutions. Link: https://gpshvac.com/wp-content/uploads/2017/07/GPS-FC48-AC-IOM-Rev-.pdf Visited Jul. 5, 2019. GPS-FC48-AC-IOM-Rev Self-Cleaning Ion Generator Device. (Year: 2019) 2 pages.

"Products" Web Page, http://www.gpshvac.com/index.php?option=com_content&view=article&id=11&itemid=93, 1 Page, Apr. 29, 2013, retrieved from Internet Archive Wayback Machine, https://web.archive.org/web/20130429232411/http://www.gpshvac.com/index.php?option=com_content&view=article&id=11&1temid=93 on Jan. 20, 2017.

"RGF Environmental Air Purification Technologies—Guardian Air HVAC Cell" Web Page, http://www.airstarsolutions.com/Pages/RGFguardian.aspx, 3 pages, Aug. 20, 2012, retrieved from Internet Archive Wayback Machine, https://web.archive.org/web/20120820000149/http://www.airstarsolutions.com/Pages/RGFguardian.aspx on Jan. 20, 2017.

\* cited by examiner
† cited by third party

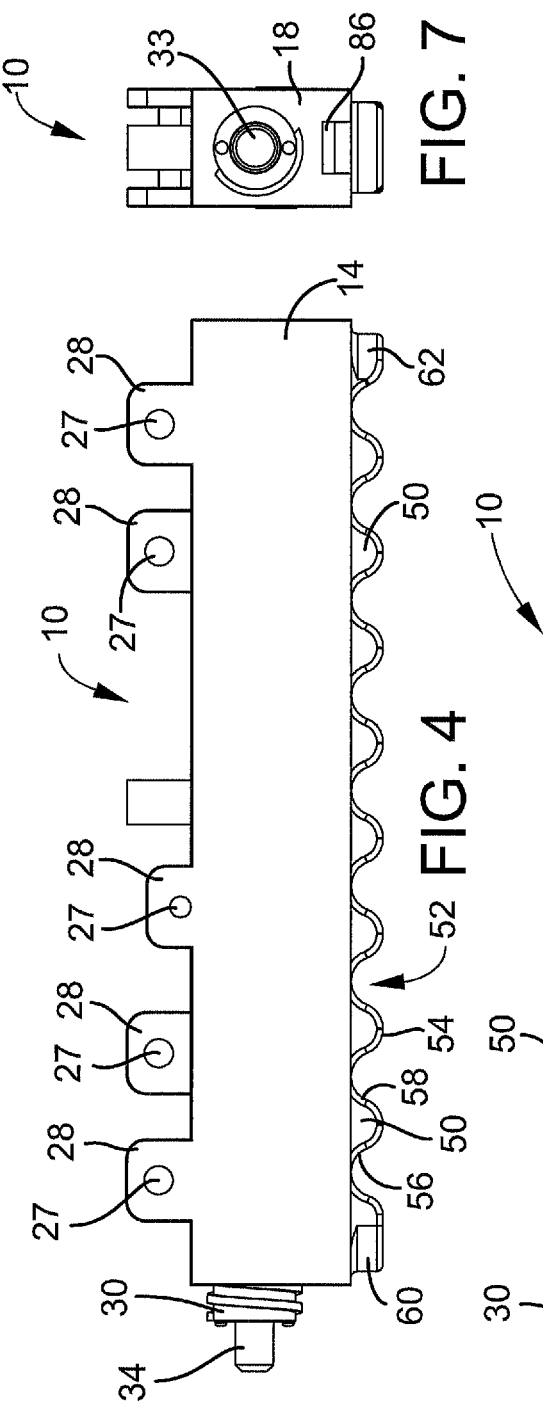

MODULAR ION GENERATOR DEVICE

CROSS REFERENCE TO RELATED PATENT APPLICATION

This application is a continuation-in-part of U.S. patent application Ser. No. 16/751,717 filed Jan. 24, 2020 and entitled "MODULAR ION GENERATOR DEVICE," which is a continuation-in-part of U.S. patent application Ser. No. 16/003,327 filed Jun. 8, 2018 and entitled "MODULAR ION GENERATOR DEVICE," which is a continuation of U.S. patent application Ser. No. 15/670,219 filed Aug. 7, 2017 and entitled "MODULAR ION GENERATOR DEVICE" which claims the benefit of U.S. Provisional Patent Application No. 62/372,053, filed on Aug. 8, 2016, and entitled "MODULAR ION GENERATION DEVICE," the contents of which are incorporated in full by reference herein.

FIELD OF THE INVENTION

The present invention relates generally to an ion generator device, and more generally relates to a modular ion generator device that may be selectively secured to at least one other modular ion generator device and mounted to a number of locations on a cooling coil frame or elsewhere in the HVAC system.

BACKGROUND OF THE INVENTION

Air and other fluids are commonly treated and delivered for a variety of applications. For example, in heating, ventilation and air-conditioning (HVAC) applications, air may be heated, cooled, humidified, dehumidified, filtered or otherwise treated for delivery into residential, commercial or other spaces.

Needs exist for improved systems and methods of treating and delivering air for these and other applications. It is to the provision of improved systems and methods meeting these needs that the present invention is primarily directed.

Historically ionization bars have been custom manufactured for a specific application length, thus requiring a lead-time for manufacturing. The present invention solves the custom manufacturing lead-time issue by providing a standard size off-the-shelf modular bar at a fixed length that can be connected in any quantity for the length required for the given application.

BRIEF SUMMARY OF THE INVENTION

According to an embodiment of the present invention an ion generator device that includes a bottom portion, two opposed side portions, a front end, a back end, and a top portion. A cavity is formed within the two opposed side portions, front end, and back end. At least one electrode is positioned within the cavity, and an engagement device is engaged to the front end and a receptacle within the back end allowing one or more modular ion generator devices to be selectively secured to each other.

According to another embodiment of the present invention, the ion generator device wherein one or more modular ion generator devices are selectively secured to one another.

According to yet another embodiment of the present invention, the modular ion generator device includes a magnet positioned on the device for selectively securing the device to a cooling coil frame.

According to yet another embodiment of the present invention, the modular ion generator device includes at least one flange extending from the device for engaging a magnet thereto.

According to yet another embodiment of the present invention, the modular ion generator device includes a printed circuit board housed within the cavity and the at least one electrode that extends outwardly from the printed circuit board.

According to yet another embodiment of the present invention, the modular ion generator device includes an electrode constructed of carbon fiber brushes.

According to yet another embodiment of the present invention, the modular ion generator device includes an electrode composed of stainless steel or any other conducting type material.

According to yet another embodiment of the present invention, the modular ion generator device includes a bottom portion that extends to an outer edge, two opposed side portions that extend upward from the outer edge, a front end that extends upward from the outer edge, a back end that extends upward from the outer edge, and a top portion. A cavity is formed within the two opposed side portions, front end, and a back end. At least one bore is disposed on the top portion, and at least one electrode is positioned within the cavity and adjacent the bore. An engagement device is engaged to the front end and a receptacle within the back end for allowing one or more ion generator devices to be selectively secured to each other.

According to yet another embodiment of the present invention, the modular ion generator device includes a power head engaged to the engagement device of the modular ion generator device.

According to yet another embodiment of the present invention, the modular ion generator device includes a cylindrical outer portion, a front end, a back end, and an area for the emitters to be exposed to the airstream. A cavity is formed within the cylindrical outer wall, front end, back end, and ionizing portion. At least one electrode is positioned within the cavity, and an engagement device is engaged to the front end and a receptacle is engaged to the back end for allowing one or more ion generator devices to be secured together.

BRIEF DESCRIPTION OF THE DRAWINGS

The present invention is illustrated and described herein with reference to the various drawings, in which like reference numbers denote like method steps and/or system components, respectively, and in which:

FIG. 3 is a bottom view of the modular ion generator device;

FIG. 4 is a side view of the modular ion generator device;

FIG. 5 is a top view of the modular ion generator device;

FIG. 6 is a front perspective view of the modular ion generator device;

FIG. 7 is a rear view of the modular ion generator device;

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 12:
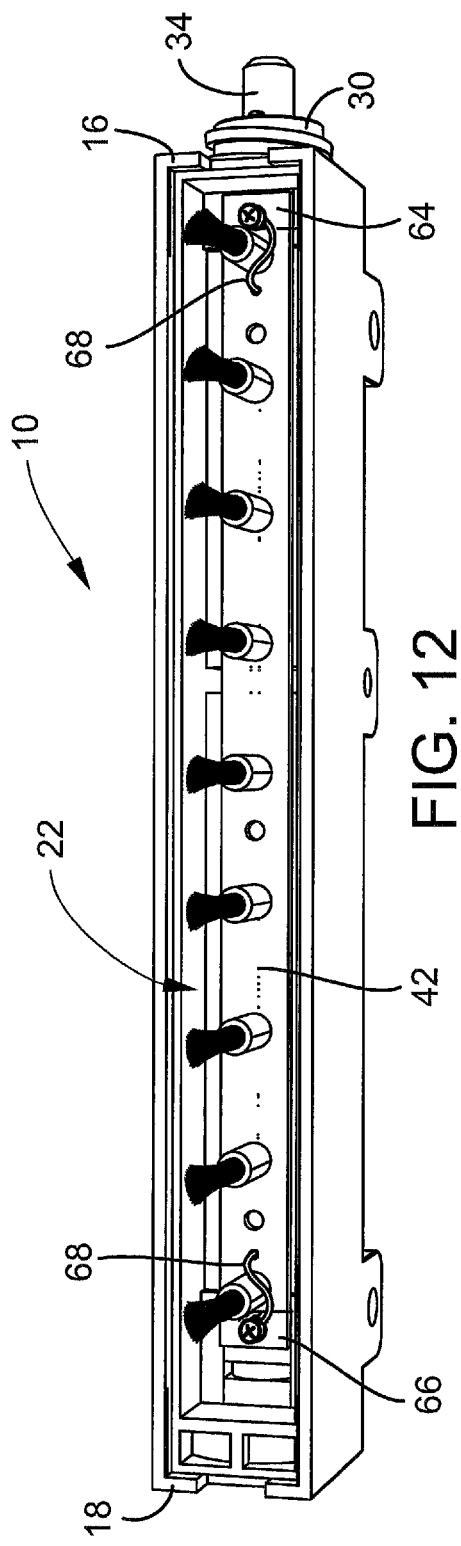
FIG. 12 is a top view of an embodiment of the modular ion generator device.
Figure 13:
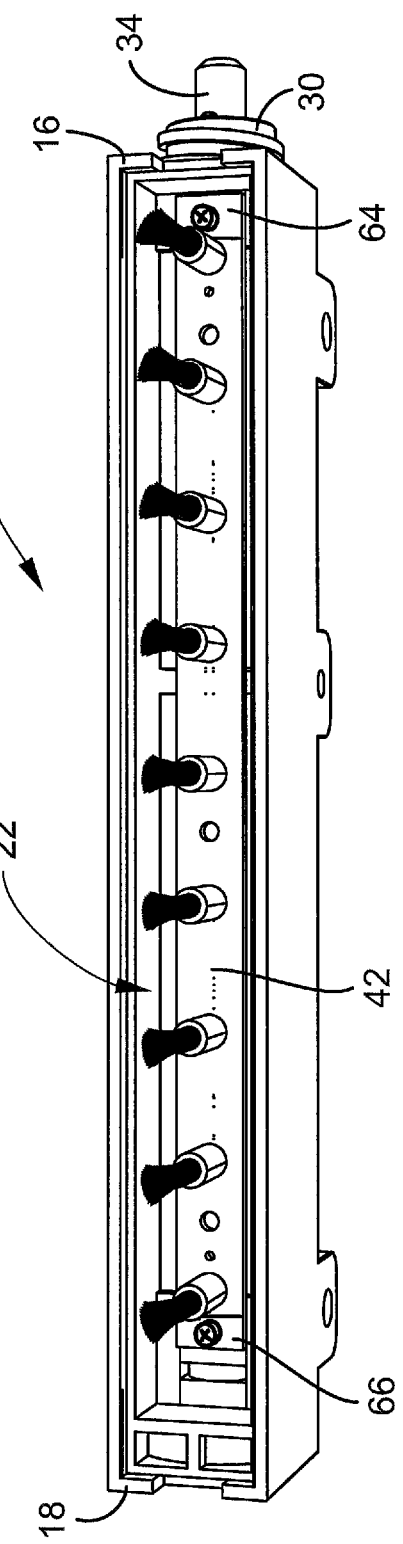
FIG. 13 is a top view of an embodiment of the modular ion generator device.

Referring now specifically to the drawings, a modular ion generator device is illustrated in FIGS. 1-20 and is shown generally at reference numeral 10. The device 10 includes a housing having a bottom portion 12 that extends to an outer edge and two opposed side portions 14, a front end 16, and a back end 18 extend upwardly from the outer edge of the bottom portion 12. The two opposed side portions 14, the front end 16, and the back end 18 may have an upper edge with a ridge for receiving a top portion 20. Alternatively, the top portion 20 may be engaged to the upper edge of the two opposed side portions 14, the front end 16, and the back end 18. A cavity 22, as shown in FIGS. 12 and 13, is formed within the bottom portion 12, two opposed side portions 14, front end 16, and back end 18.

Figure 8:
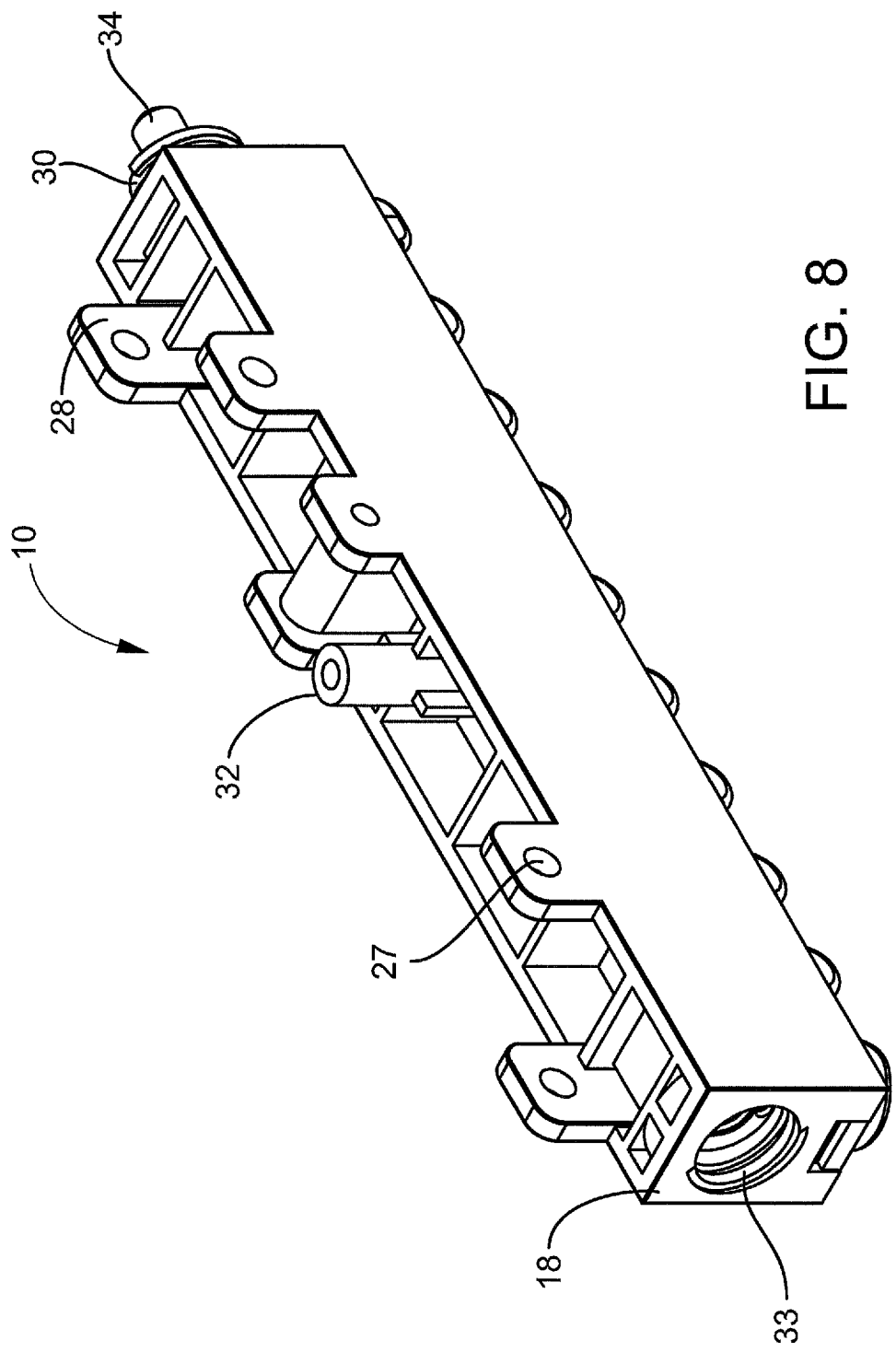
FIG. 8 is a perspective view of the modular ion generator device.
Figure 9:
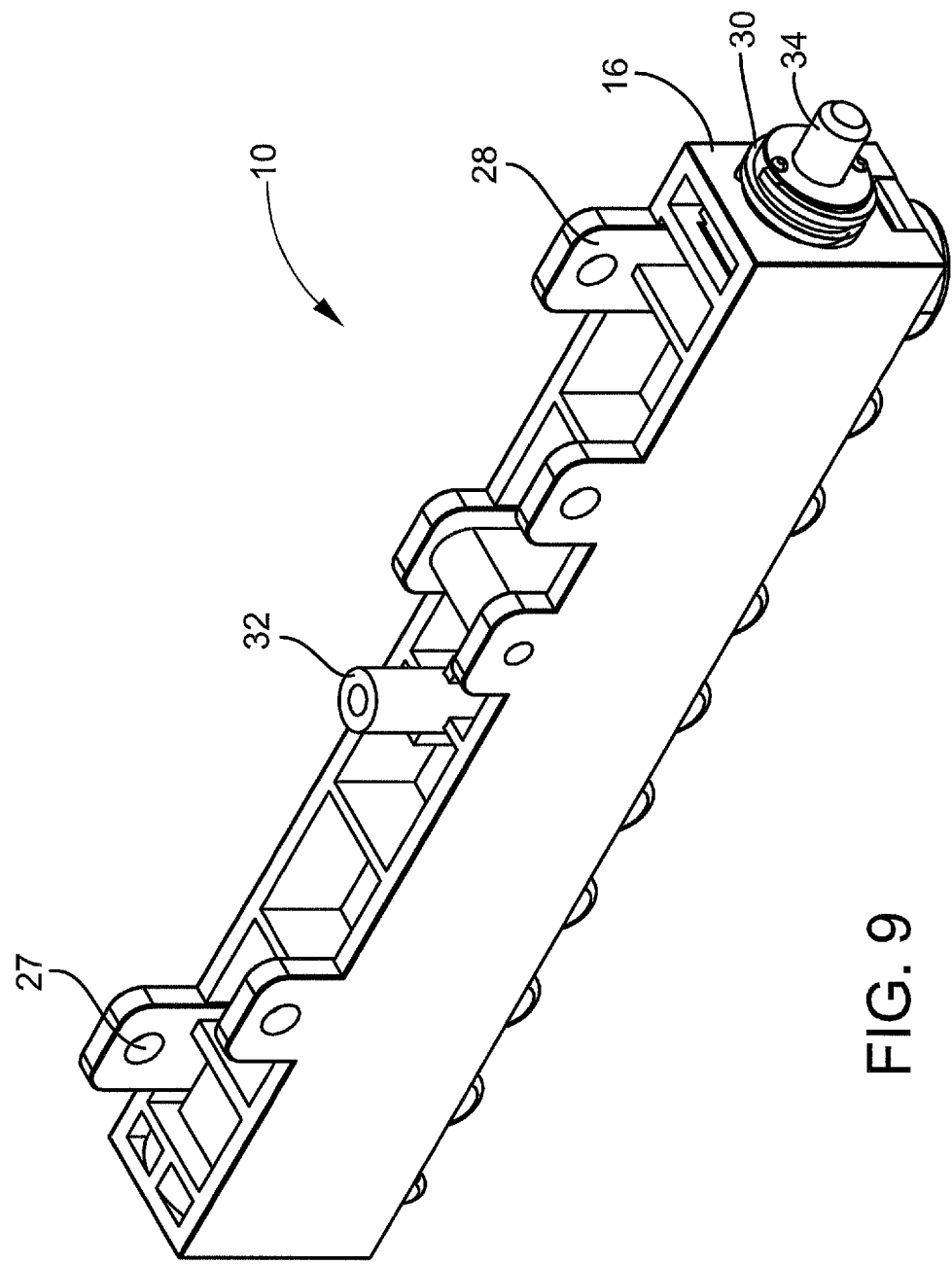
FIG. 9 is a perspective view of the modular ion generator device.

Engagement flanges 28 are disposed on the device 10. As illustrated in FIGS. 8 and 9, at least one engagement flange 28 is disposed on each of the two opposed side portions 14. Preferably, at least two engagement flanges 28 are disposed on each of the two opposed side portions 14, and most preferably two or more engagement flanges 28 are disposed on each of the two opposed side portions 14. The flanges 28 extend away from the two opposed side portions 14 and contain a bore 27 within each flange 28 and preferably centrally located within each flange 28, extending from an exterior side to an interior side of the flange 28. As illustrated, one flange 28 may have a length less than the length of other flanges 28 on the device 10. Specifically and as shown in FIGS. 4 and 5, when the device contains three flanges 28 on each of the two opposed side portions 14, one of the flanges 28, such as the flange 28 between the two other flanges 28, may have a length less than the length of the adjacent flanges 28.

Figure 20:
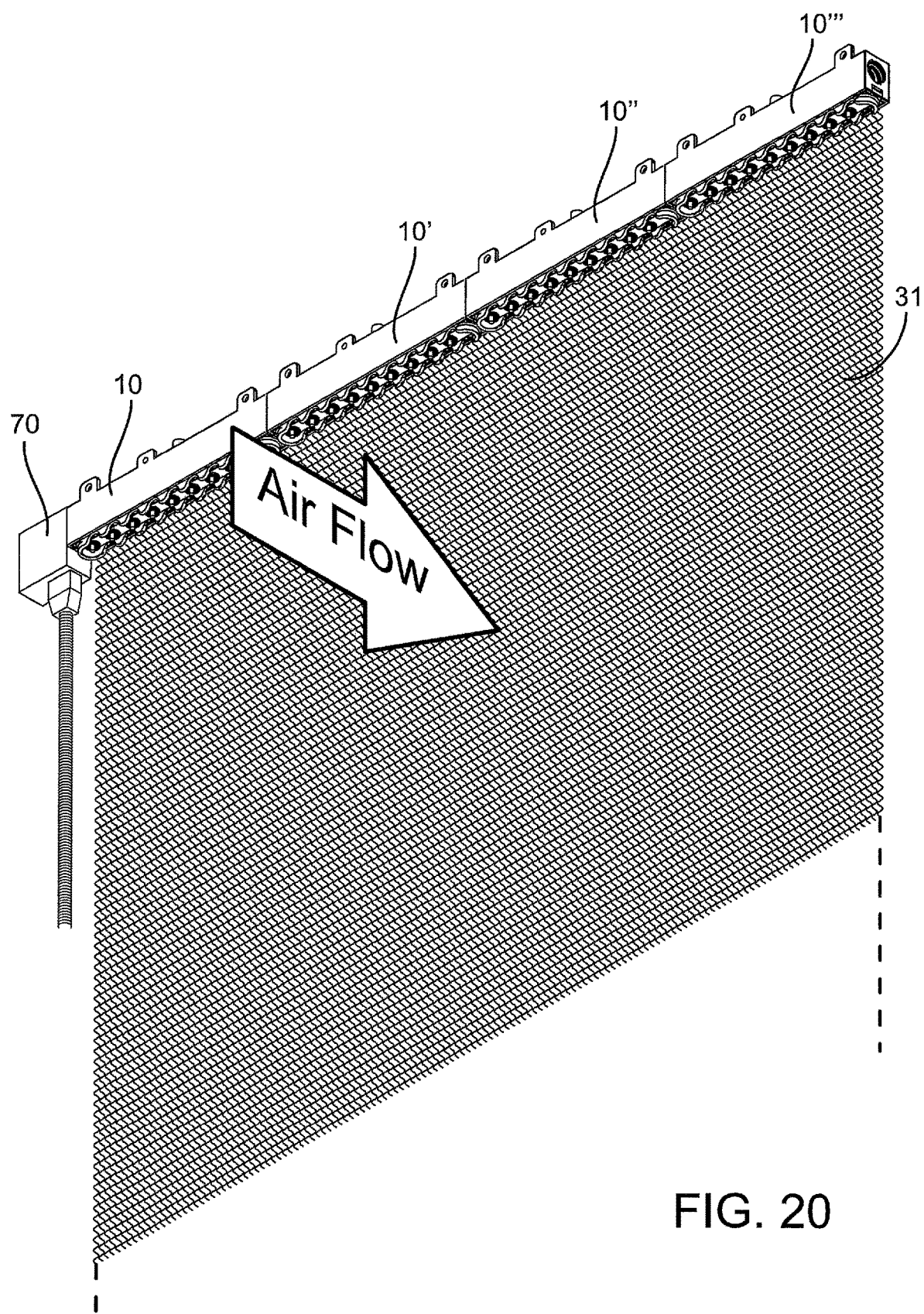
FIG. 20 is a view of the modular ion generator devices in use.

A magnet may be engaged to each flange 28. The magnet may be circular and engaged through the flange 28 with a portion of the magnet extending through the bore 27 and selectively securing the magnet to the flange 28. In this arrangement, the device 10 may be face mounted to a coiling coil frame 31, as illustrated in FIG. 20, or elsewhere on the HVAC system. The magnet may include a post on the back side of the magnet that is received within the bore 27 of each flange 28. The bottom portion 12 may also contain at least one post 32. The post 32 may also receive a magnet. The post 32 contains a bore for receiving a post on the back side of the magnet. In this arrangement, the device 10 may be mounted to the ceiling.

Figure 1:
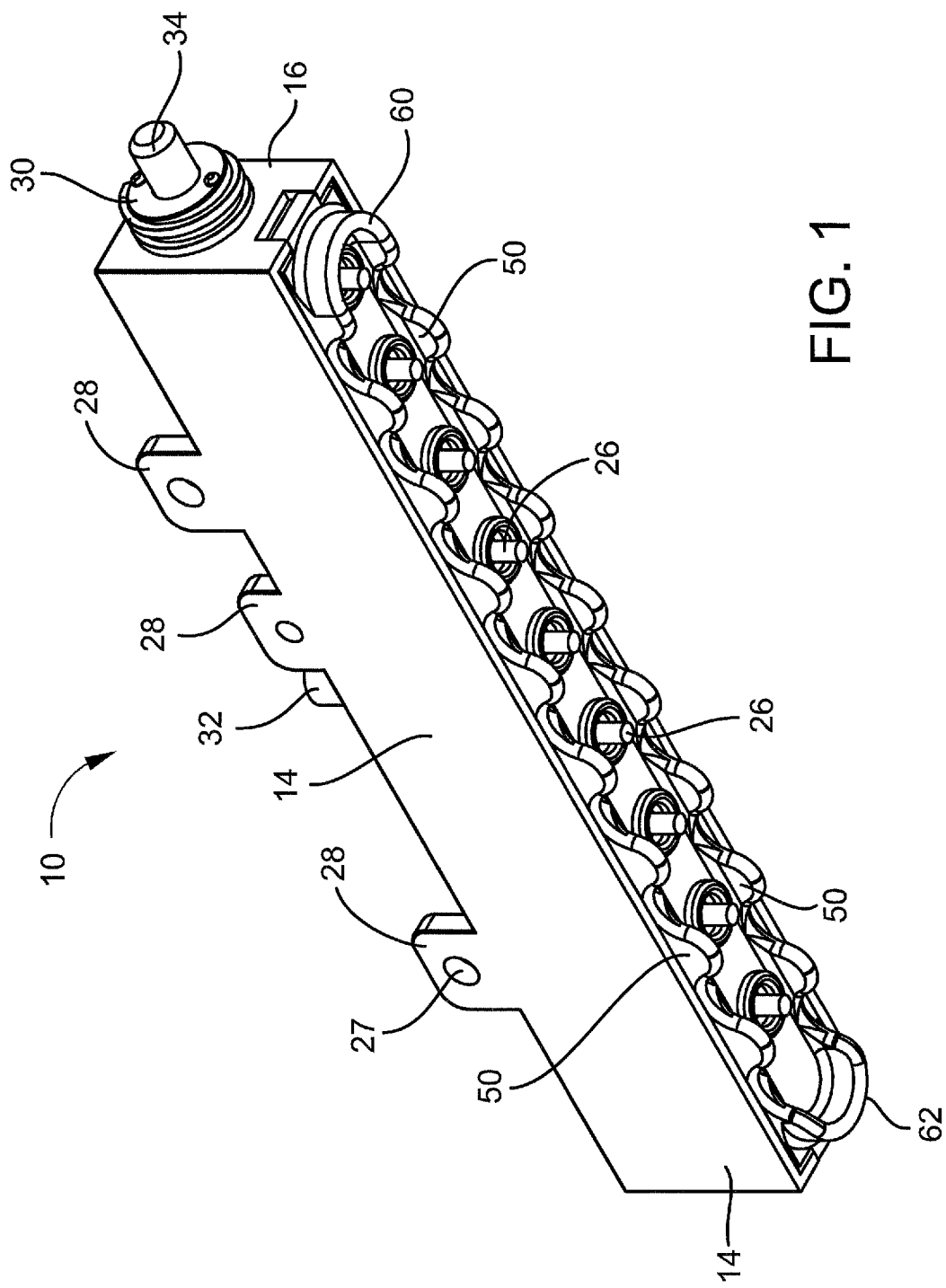
FIG. 1 is a perspective view of the modular ion generator device.
Figure 10:
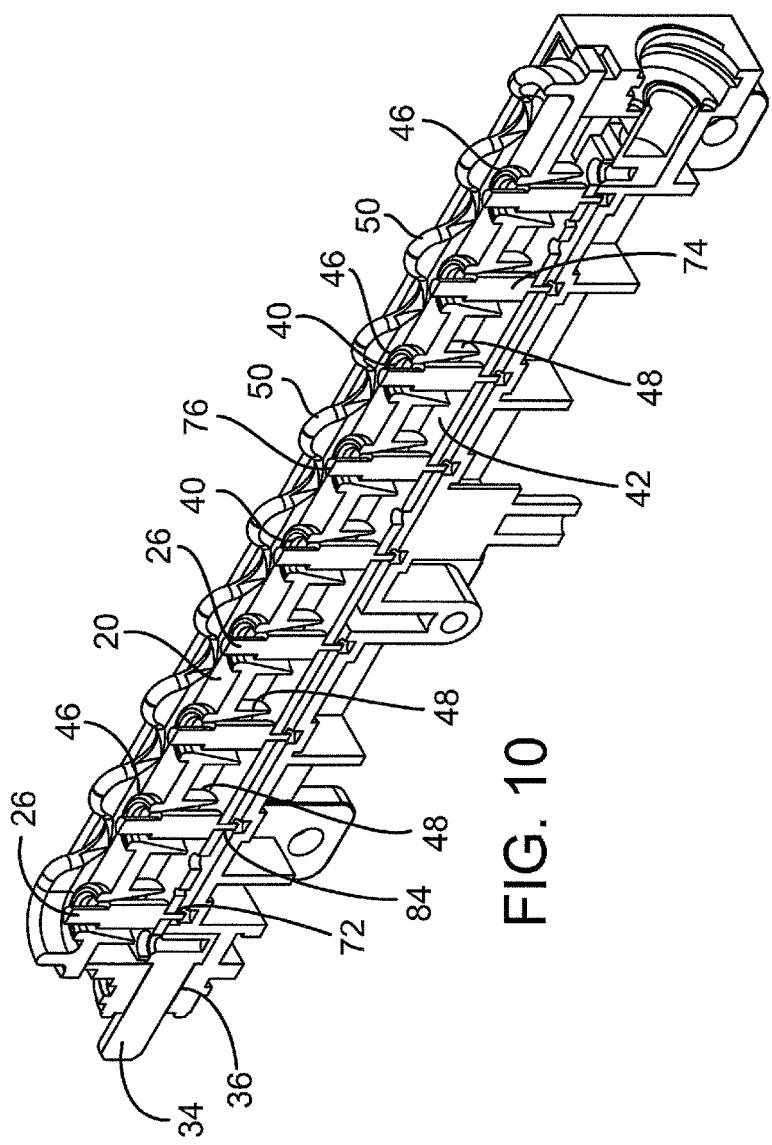
FIG. 10 is a cut-away view of the modular ion generator device.
Figure 11:
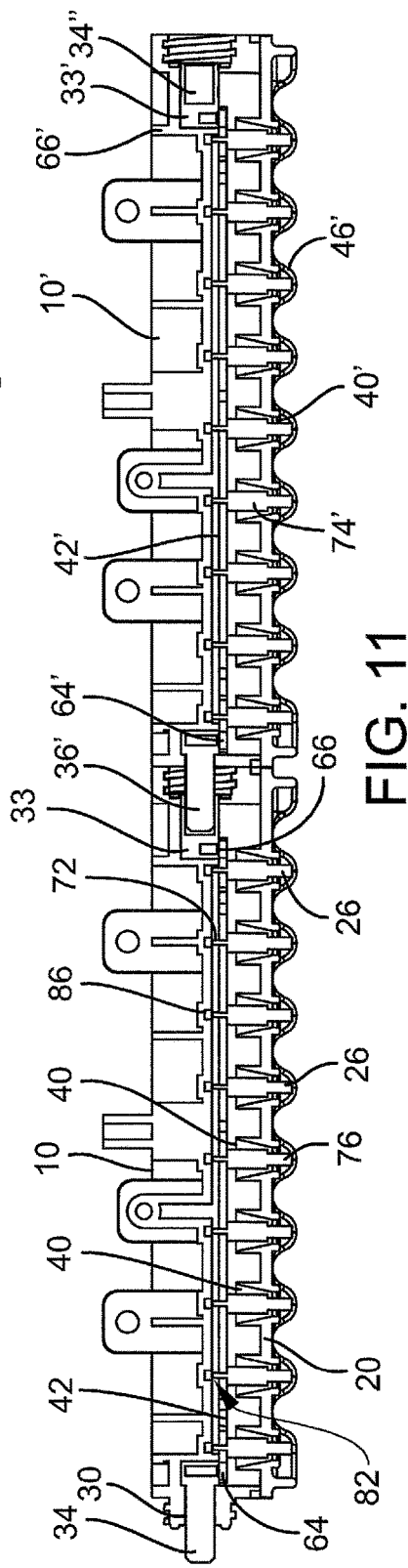
FIG. 11 is a cut-away view of three modular ion generator devices mated together.

As shown in FIGS. 1, 9, and 11, a collar 30 extends outwardly from the front end 16 of the device 10 that is externally threaded and has a hollow inner portion 36 that extends from the cavity 22 to the external side of the collar 30. The collar 30 is preferably circular. A conductive device 34 is disposed within a hollow inner portion 36, as shown in FIG. 10, of the collar 30. The conductive device 34 has a first end and a second end. The first end of the conductive device 34 is disposed within the cavity 22 of the device 10 and may be engaged to the first electrical connector 64 for allowing electricity to flow from the conductive device 34 to the first electrical connector 64. Alternatively, the conductive device 34 is coupled to the first electrical connector 64 for allowing electricity to flow from the conductive device 34 to the first electrical connector 64. The conductive device 34 extends from the cavity 22 of the device 10, through the hollow inner portion 36 of the collar 30, and extends outwardly from the exterior face of the collar 30, wherein the second end of the conductive device 34 is spaced apart and clears the exterior face of the collar 30.

Figure 2:
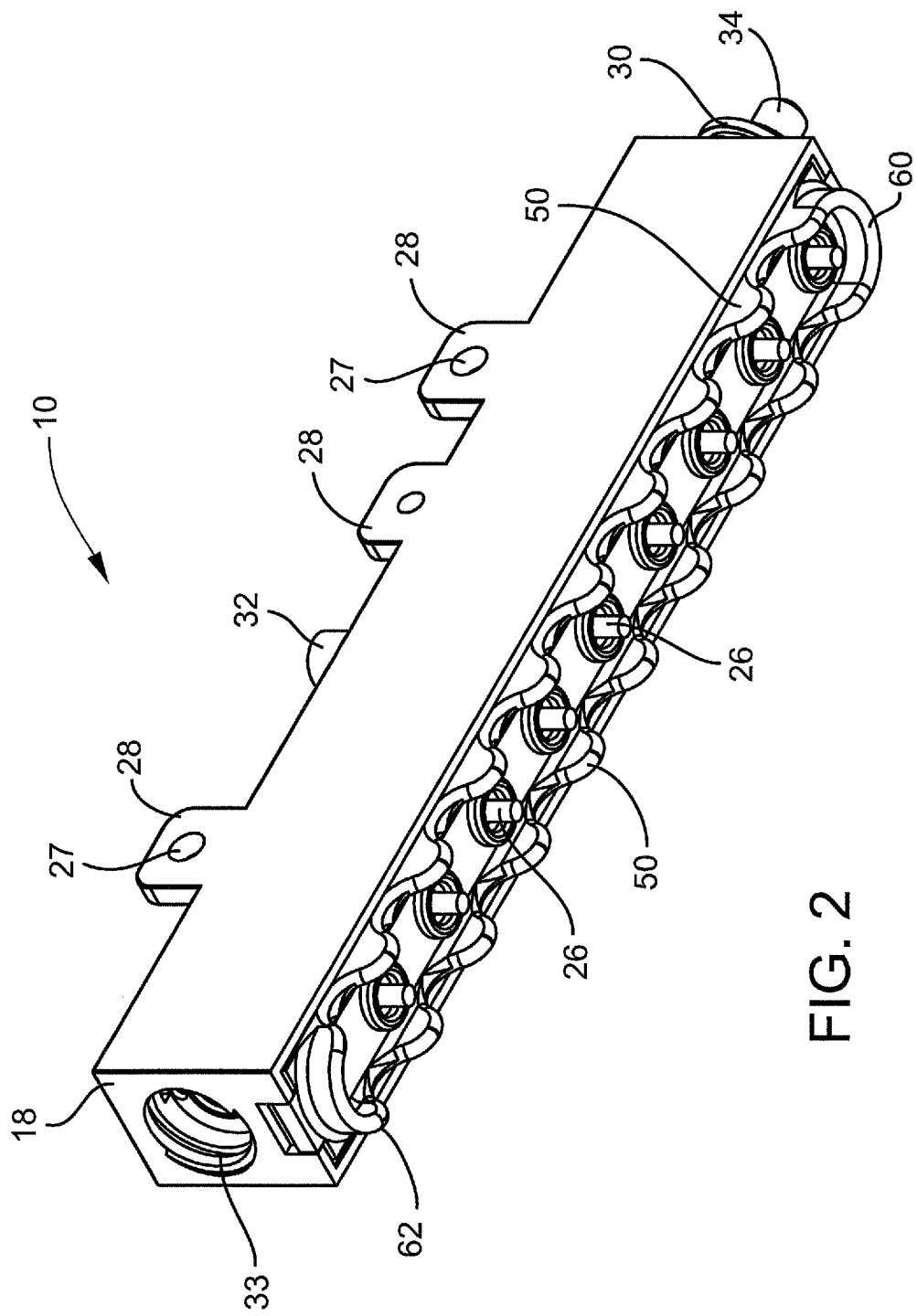
FIG. 2 is a perspective view of the modular ion generator device.

The conductive device 34 is composed of brass or other conductive material and may be generally circular or have a circular cross-section. As shown in FIGS. 2, 7, and 8, the back end 18 of the device 10 may contain a receptacle 33, composed of brass or other conductive material, lined with brass or other conductive material, or containing a conductive element. The receptacle 33 is internally threaded and corresponds to the external threads of the collar 30. The receptacle 33 receives the conductive device 34 for selectively securing a first generator device 10 with a second generator device 10', as shown in FIGS. 16-19. As illustrated, the conductive device 34 may be generally circular and the receptacle 33 may be correspondingly generally circular or correspondingly shaped for receiving the conductive device 34. The diameter of the receptacle 33 is slightly larger than the diameter of the conductive device 34 for inserting the conductive device 34 into the receptacle 33.

As shown in FIGS. 14, 15, 16, and 17, the conductive device 34 of the first generator device 10 is inserted into the receptacle 33 of the second generator device 10'. Either the first generator device 10 or the second generator device 10' is rotated with respect to the opposite generator device, causing the external threads of the collar 30 of the first generator device 10 to mesh and engage the internal threads of the receptacle 33 of the second generator device 10' forming a selectively secured arrangement. In a similar process, the second generator device 10' may be selectively secured to a third generator device 10", and the third generator device 10" may be selectively secured to a fourth generator device 10''', as shown in FIG. 20. A selectively secured arrangement means the first generator device 10 and the second generator device 10' are not integral with each other but may be separated from each other without damaging the devices and reused. A cap may be disposed within the receptacle 33 if no ionization device will be inserted into the receptacle 33.

As shown in FIG. 10, each opening 40 of the top portion 20 contains an upwardly extending rim 46 and a lower extending shield 48. The rim 46 is positioned around the external side of the opening 40 and on the exterior surface of the top portion 20. The rim 46 extends upwards from the exterior surface of the top portion 20 and contains an upper edge. The shield 48 extends downwardly from the interior surface of the top portion 22 and opening 40 and into the cavity 22. The rim 46 completely encircles the exterior portion of the opening 40 and is disposed and visible on the exterior surface of the top portion 22.

The shield 48 extends downwardly from the interior portion of the opening 40 and the internal surface of the top portion 22. The shield 48 is angled outwards from the interior portion of the opening 40. In other words, as the shield 48 extends downwards from the interior portion of the opening 40, the shield 48 extends away from a central point of the opening 40. The diameter of the shield 48 is smaller closest the interior portion of the opening 40 and interior surface of the top portion 22 and gradually increases as the shield 48 extends outward.

Each device 10 contains at least one electrode 26, two or more electrodes 26, or a plurality of electrodes 26, as shown in FIGS. 8 and 9. The electrodes 26 are engaged or connected to a printed circuit board 42 housed within the cavity 22 of the device 10. The printed circuit board 42 generally extends along the length of the device 10 and between the front end 16 and the back end 18 of the device 10. The printed circuit board 42 allows electricity to flow along the length of the device 10 and within the cavity 22 of the device 10. A trace extends along the length of the printed circuit board 42 and carries electricity along the length of the printed circuit board 42. The trace is engaged to each electrode 26, allowing electricity to flow through the electrode 26.

As shown in FIGS. 10 and 11, the printed circuit board 42 has a plurality of spaced-apart bores 72 wherein a portion of the electrodes 26 extend through the bore 72 of the printed circuit board 42. The electrodes 26 contain a main body portion 74 that is centrally located and an emitter 76 extends upward from the main body portion 74 and through the bore 72 in the top portion 20 of the device 10. The emitter 76 emits the ions. A retention portion 82 extends downwardly from the main body portion 74 and through the bore 72 of the printed circuit board 42. The retention portion 82 consists of an elongate portion 84 having a first end and a second end. The first end of the elongate portion 84 extends downwardly from the main body portion 74 and has a width or diameter smaller than the main body portion 76. The elongate portion 84 extends through the bore 72 of the printed circuit board 42. A knob 86 is disposed on the second end of the elongate portion 84 for securing the electrode 26 to the printed circuit board 42. The width of the main body portion 74 and the width of the knob 86 are greater than the width of the bore 72 of the printed circuit board 42, retaining the emitter 72 to the printed circuit board 42. Alternatively, a portion of the electrode 26 may be soldered to the printed circuit board 42. For example, the second end of the elongate portion 84 may be soldered to the printed circuit board 42.

Alternatively, the electrodes 26 may extend upwardly from the printed circuit board 42 or coupled to the printed circuit board 42 by a wire, connector, or other electrical conducting device that allows electrical current to flow from the printed circuit board 42 to the electrodes 26.

The electrode 26 is positioned within each opening 40 so that ions can be emitted from the emitter 76 of the electrode 26 and into the surrounding air. For example, the electrode 26 may be positioned in the cavity 22 and below an upper edge of the rim 46. Alternatively, the electrode 26 is positioned within the cavity 22 and the emitter 76 extends above the height of the rim 46 for allowing ions to be emitted into the surrounding air. In another embodiment, the electrode 26 may be positioned entirely within the cavity 22, allowing electrodes 26 to proceed through the opening 40 and into the surrounding air. The openings 40 are preferably centrally positioned and spaced-apart along the length of the top portion 20, extending from the exterior surface of the top portion 20 the interior surface of the top portion 20. The openings 40 are preferably disposed in a straight line along the length of the top portion 20 and centrally disposed.

Alternatively, the device 10 contains a plurality of openings 40 centrally positioned and spaced-apart along the length of the top portion 20. The openings 40 extend from the external surface of the top portion 20 to the internal surface of the top portion 20. The openings 40 are disposed in a straight line along the length of the top portion 20. The device 10 may contain one opening 40, two or more openings 40, or a plurality of openings 40. An electrode 26 may be positioned adjacent the opening 40 for allowing ions to be emitted through the opening 40. Alternatively, the electrode 26 may extend through the opening 40 for emitting ions.

Electrical current flows along the length of the printed circuit board 42, through the trace, allowing a portion of the electrical current to flow from the circuit board 42 and through the electrodes 26, if the electrodes 26 are engaged to the circuit board 42, allowing ions to flow from the end or ends of the electrodes 26. If the electrodes 26 are electrically coupled to the circuit board 42 by a wire, connector, or other electrical conducting device, the electrical current flows through the wire, connector, or other electrical conducting device and through the electrodes 26. An epoxy may be deposited within the cavity 22 and over the printed circuit board 42. The epoxy may be inserted into the cavity 22 of the device 10 through an access opening 86 disposed within the device 10 that extends from the exterior surface to the interior surface of the device 10 and provides access to the cavity 22.

The housing of the device 10 may contain a plurality of ridges 50 disposed on the device 10. The ridges 50 are preferably located adjacent the electrodes 26, or at least a majority of the electrodes 26. As shown in FIGS. 1, 4, and 5, a plurality of ridges 50 are disposed on the device 10 and spaced apart from each other. The ridges 50 are preferably located on the top portion 20 of the housing of the device 10, however the ridges 50 may be located on the opposed side portions 14 or on the upper edge of the opposed side portions 14. By way of an example only, the ridges 50 may be integral with the side portions 14, engaged to the side portions 14, engaged to the upper edge of the side portions 14, integral with the upper edge of the side portions 14, integral with the top portion 20, or engaged to the top portion 20. The ridges 50 are disposed on either side of the electrodes 26, and preferably extend to a height that is above the height of the electrodes 26. The ridges 50 preferably have a width that is greater than the width of the electrodes 26. A space 52 is positioned between each ridge 50 allowing air to flow between the ridges 50. The ridges 50 are spaced-apart in both the lateral and longitudinal directions. The ridges 50 are disposed on either side of the device 10 and spaced apart from each other. The ridges 50 on opposed sides of the top portion 20 face each other and are symmetrically aligned on either side of each electrode 26, or at least most electrodes 26.

The ridges 50 are preferably parabolic shaped. In other words, the ridges 50 have an arcuate top portion 54 and a first side 56 and a second side 58. The first side 56 and the second side 58 extend downwardly and outwardly from the arcuate top portion 54 to the top portion 20, the side portion 14, or the upper ridge of the side portion 14 of the housing of the device 10. The distance between the first side 56 and the second side 58 of the portion of the ridge 50 adjacent the top portion 20 is greater than the distance between the first side 56 and the second side 58 of the ridge 50 adjacent the arcuate top portion 54. In other words, the width of the ridge 50 increases as it extends downward from the arcuate top portion 54. The ridges 50 may also be another shape sufficient for the purposes of the invention, such as square, triangle, rectangular or other geometric shape.

At the front end 16 and back end 18 of the housing of the device 10, a first extension 60 and a second extension 62 extend upwards from the device, and as illustrated extend upwards from the top portion 20 of the device 10. The first extension 60 is adjacent the front end 16 and the second extension 62 is adjacent the back end 18. The first extension 60 and the second extension 62 are generally c-shaped, and as shown in FIGS. 2 and 5, the first extension 60 and the second extension 62 do not have to be identical. The first extension 60 may partially surround an electrode 26, while the second extension 62 may or may not partially surround an electrode 26. The first extension 60 may be positioned entirely on the top portion 20 of the housing or may be positioned on the front end 16, positioned on the front end 16 and the top portion 20, positioned on the front end 16 and opposed side portions 14, or positioned on the front end 16, opposed side portions 14, and the top portion 20. The second extension 62 may be positioned entirely on the top portion 20 of the housing or may be positioned on the back end 18, positioned on the back end 18 and the top portion 20, positioned on the back end 18 and opposed side portions 14, or positioned on the back end 18, opposed side portions 14, and the top portion 20.

The printed circuit board 42 may be engaged within the device 10 in two alternative arrangements. As illustrated in FIG. 12, a first electrical connector 64 and a second electrical connector 66 are positioned on either side of the cavity 22. The first electrical connector 64 may be positioned adjacent the internal side of the front end 16 and the second electrical connector 66 may be positioned adjacent the internal side of the back end 18. The first electrical connector 64 positioned adjacent the internal side of the front end 16 is engaged to or coupled to the conductive device 34 for allowing electricity to flow from the conductive device 34 directly to the first electrical connector 64 or from the conductive device 34, through a coupler, and from the coupler to the first electrical connector 64. The second electrical connector 66 is coupled to a conductive element within the receptacle 33 for allowing electricity to flow from the second electrical connector 66 to the receptacle 33 and allowing electricity to progress from the conductive element within the receptacle 33 to a conductive device 34 that may be selectively secured to the receptacle 33.

The first electrical connector 64 and second electrical connector 66 each contain an eye for receiving the first end of a wire 68. The second end of the wire 68 is engaged to an end of the printed circuit board 42 and allowing electricity to flow from the first electrical connector 64 through the wire 68 to the first end of the printed circuit board 42. The electricity flow through the printed circuit board 42, allowing a portion of the electricity to flow through the electrodes 26 and producing ions, wherein the remainder of the electricity progresses down the printed circuit board 42 towards the second end. The remainder of the electricity flows to the second end of the printed circuit board 42 and through the wire 68 to the second electrical connector 66. A screw or other fastener may be used to engage the first electrical connector 64, a second electrical connector 66, and printed circuit board 42 to the device 10.

Alternatively, as shown in FIG. 13, the first end of the printed circuit board 42 is engaged to the first electrical connector 64 and the second end of the printed circuit board 42 is engaged to the second electrical connector 66. The first electrical connector 64 and first end of the printed circuit board 42 each contain a hole, and the hole in the printed circuit board 42 is placed overtop the hole in the first electrical connector 64. A fastener, such as a screw, is inserted in the hole, allowing electricity to flow from the first electrical connector 64 through the screw and into the printed circuit board 42. The second electrical connector 66 and second end of the printed circuit board 42 each contain a hole, and the hole in the printed circuit board 42 is placed overtop the hole in the second electrical connector 66. A fastener, such as a screw, is inserted in the hole, allowing electricity to flow from the printed circuit board 42 and into the second electrical connector 66.

The electrodes 26 may consist of a high voltage wire having a first end and a second end. The first end of the high voltage wire may contain a plurality of bristles or clusters that extend upwardly from the printed circuit board 42. The bristles are composed of any material that conducts electricity. The bristles or clusters may be composed of nylon, carbon fibers, or a thermoplastic polymer imbedded with conductive material that allows the polymer to conduct electricity. For example, the bristles may be composed of polypropylene or polyethylene and impregnated with carbon. Generally, the bristles of the electrode 26 may contain between about 20 to about 80 wt % polypropylene copolymer or polyethylene copolymer, between about 5 to about 40 wt % talc, and from about 5 to 40 wt % carbon black. However, any other resistive, inductive, reactive or conductive plastic or non-metallic material may be utilized for the bristles. As illustrated in FIG. 4, the electrode consists of a plurality of carbon fibers having a first end and a second end. The first end is engaged to the printed circuit board 42 for receiving the flow of electricity flowing through the printed circuit board 42 and the second end extends upwardly from the printed circuit board 42 for emitting ions. Each fiber within the cluster can emit ions from its second end.

Alternatively, the electrode 26 may be composed of stainless steel or other conducting type material, wherein the emitter 76 of the electrode has a point, or a diameter that is less than the diameter of the main body body portion 74, allowing ions to be emitted from the emitter 76. Preferably, the reduction in diameter of the emitter 76 for a point or sharp tip, allowing the ions to be emitted from the point or sharp tip of the emitter 76.

The device 10 may produce approximately equal amounts of positive and negative ions, regardless of airflow velocity or other conditions such as humidity or temperature. In example forms, the device 10 produces positive ions and negative ions in a concentration of at least about 40 million ions per cubic centimeter as measured 2 inches from the device electrodes. In alternate embodiments, the device generates negative ions only, or positive ions only, or generate negative ions and positive ions in unequal quantities.

In one embodiment, the top portion 20 of the device 10 may contain an LED bore that extends through the top portion 20 and into the cavity 22. An LED light may be positioned over the LED bore and engaged to an LED wire that extends from a circuit board to the LED light. When current is flowing through the high voltage wires current also flows through the LED wire and illuminates the LED light, indicating the device 10 is operating. The top portion 20 contains a first power supply bore and a second power supply bore for receiving the positive and negative power supply wires that serve as the power supply source.

The device 10 may be positioned and secured in place within the housing of the air handler unit such that the electrodes are aligned generally perpendicularly to the direction of the airflow across the device 10, to prevent recombination of the positively charged ions with the negatively charged ions.

The treatment of air by delivery of bipolar ionization to an airflow within a conduit according to the systems and methods of the present invention may be utilized for various purposes. For example, application of bipolar ionization to an airflow within an HVAC conduit such as an air handler housing or duct may be utilized to abate allergens, pathogens, odors, gases, volatile organic compounds, bacteria, virus, mold, dander, fungus, dust mites, animal and smoke odors, and/or static electricity in a treated air space to which the airflow is directed. Ionization of air in living and working spaces may reduce building related illness and improve indoor air quality; and additionally can reduce the quantity of outside air needed to be mixed with the treated indoor air, reducing heating and cooling costs by enabling a greater degree of air recirculation.

As shown in FIG. 20, a power head 70 provides, preferably AC current, to the device 10. Alternatively, the power head 70 could provide DC current. The power head 70 contains a receptacle, similarly to the receptacle 33 on the device 10, allowing the conductive device 34 of the device 10 to be inserted and selectively secured to the power head 70 through this receptacle. The power head 70 is a power supply for providing electricity to the device 10, and specifically the electricity flows from the power head 70 to the conductive device 34 of the device 10. The electricity flows through the conductive device 34 to the first electrical connector 64 that is engaged or coupled to the conductive device 34. The electricity then flows through the first electrical connector 64 and into the printed circuit board 42 and then to the electrodes 26.

The receptacle of the power head 70 is internally threaded and corresponds to the external threads of the collar 30 of a device 10. The receptacle of the power head 70 is generally circular or other corresponding shape to the collar 30. As illustrated, the collar 30 is circular and the receptacle of the power head 70 is also circular for allowing the collar 30 and the second end of the conductive device 34 to be inserted into the receptacle. The diameter of the receptacle is slightly larger than the diameter of the collar 30, allowing the collar 30 to fit within the receptacle the external threads of the collar 30 to mate or mesh with the internal threads of the receptacle, forming a selectively secured arrangement. The receptacle of the power head 70 may be composed of brass or other conductive material, lined with brass or other conductive material, or contain a conductive element for allowing electricity to flow from the power head to the conductive device 34.

The electrodes 26 within the ionizer may be removable or replaceable. The emitter 76 may be constructed of conductive resins, gold, titanium, stainless steel, or any other corrosion resistant conductive material.

Figure 14:
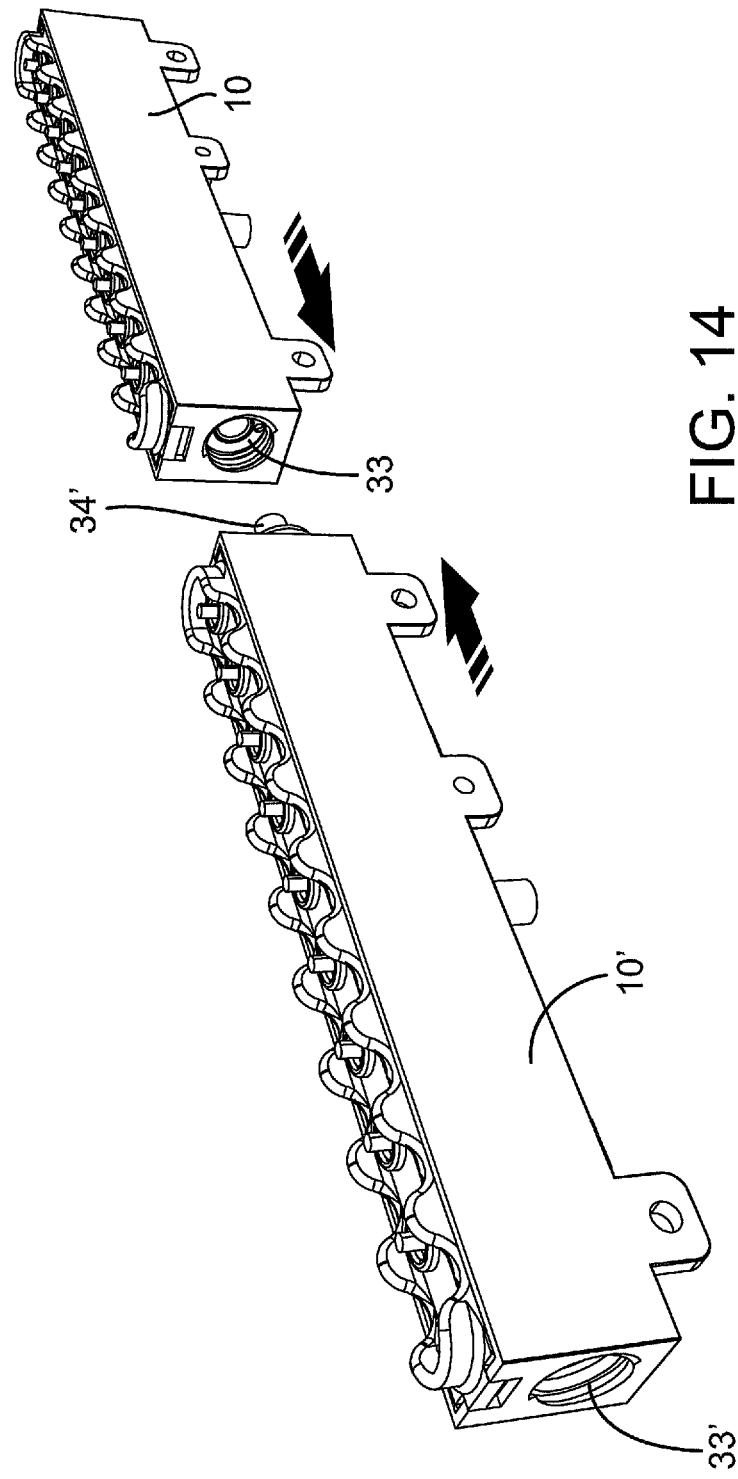
FIG. 14 is a perspective view of two modular ion generator devices.
Figure 15:
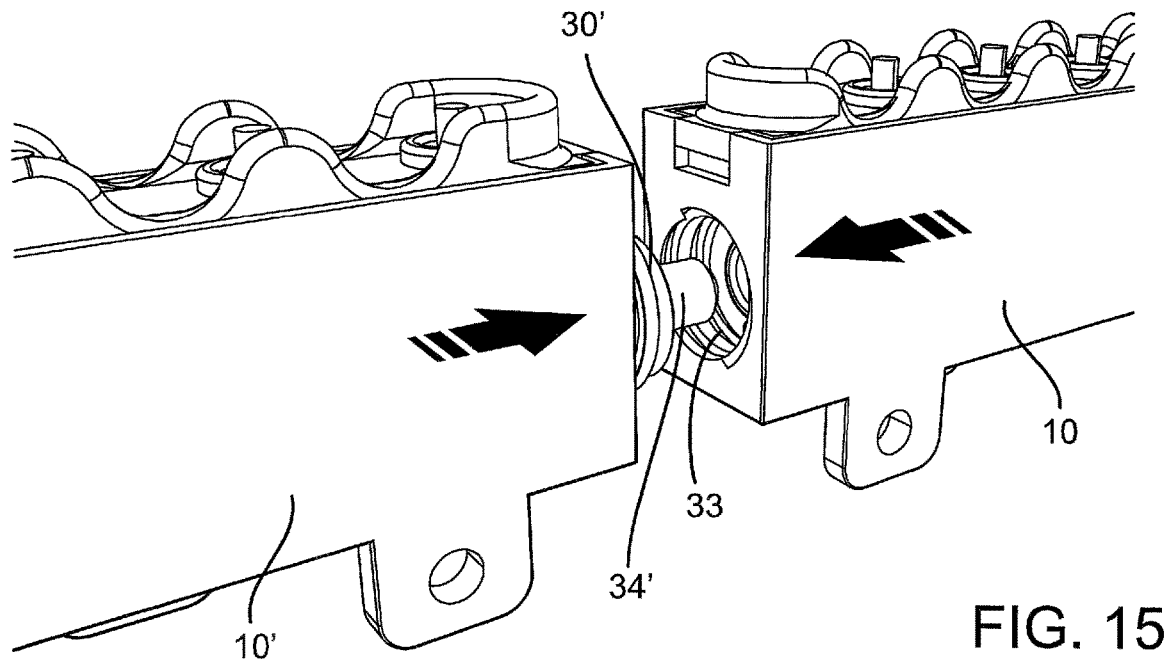
FIG. 15 is a perspective view of two modular ion generator devices mating together.
Figure 16:
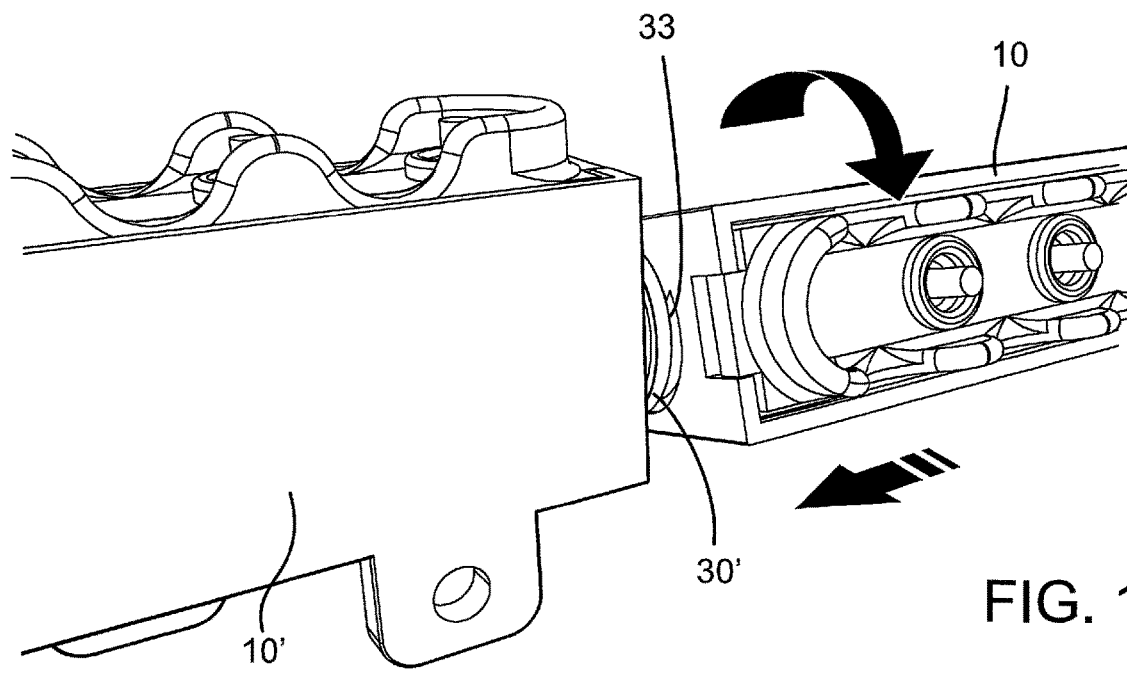
FIG. 16 is a perspective view of two modular ion generator devices mating together.
Figure 17:
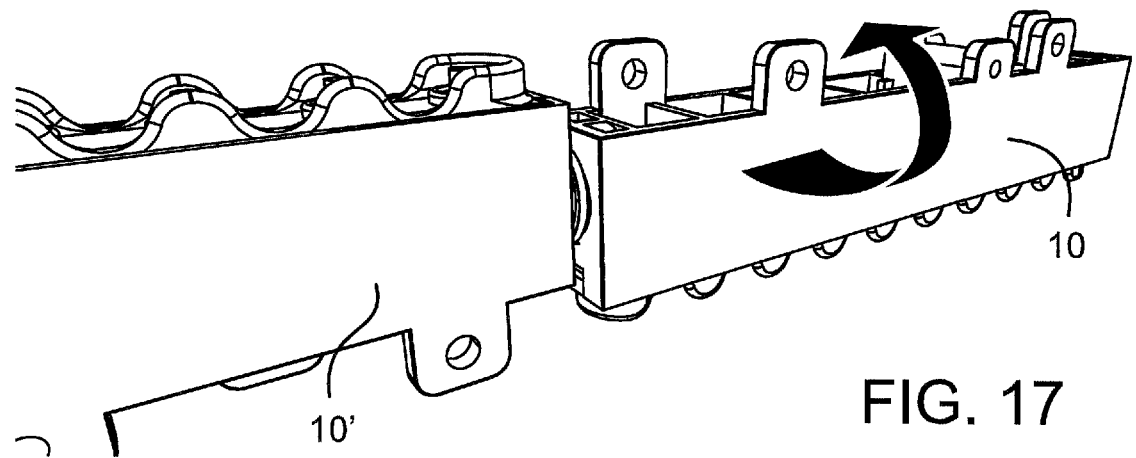
FIG. 17 is a perspective view of two modular ion generator devices mating together.
Figure 18:
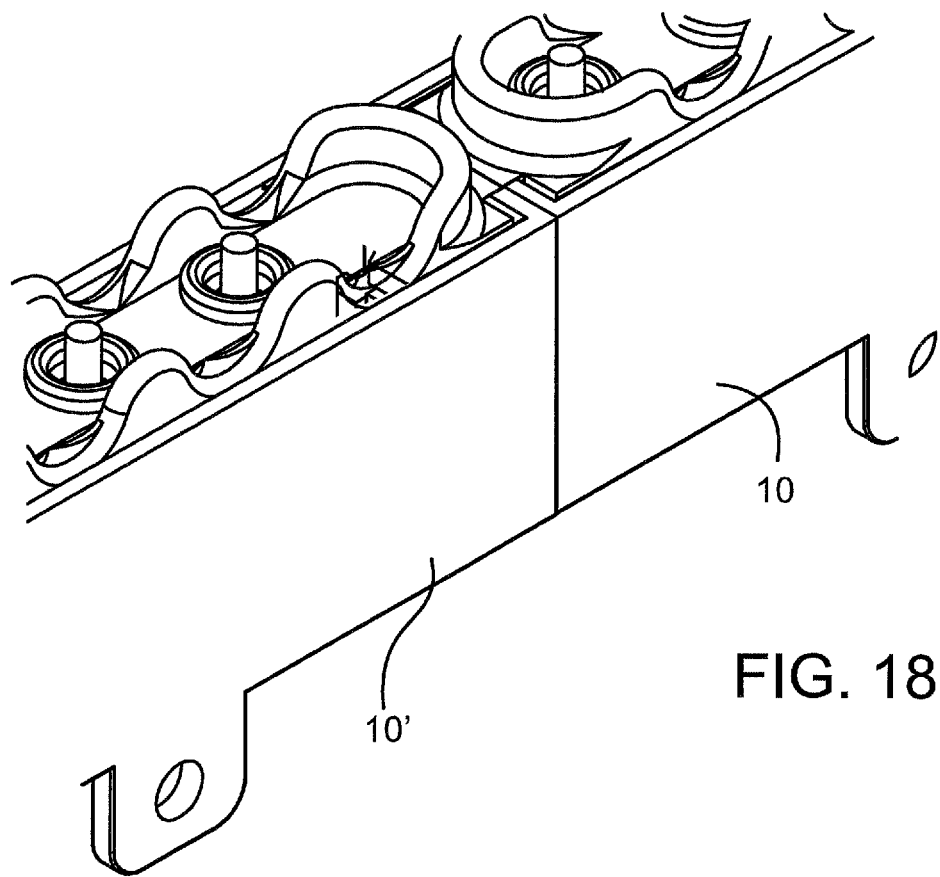
FIG. 18 is a perspective view of two modular ion generator devices engaged together.
Figure 19:
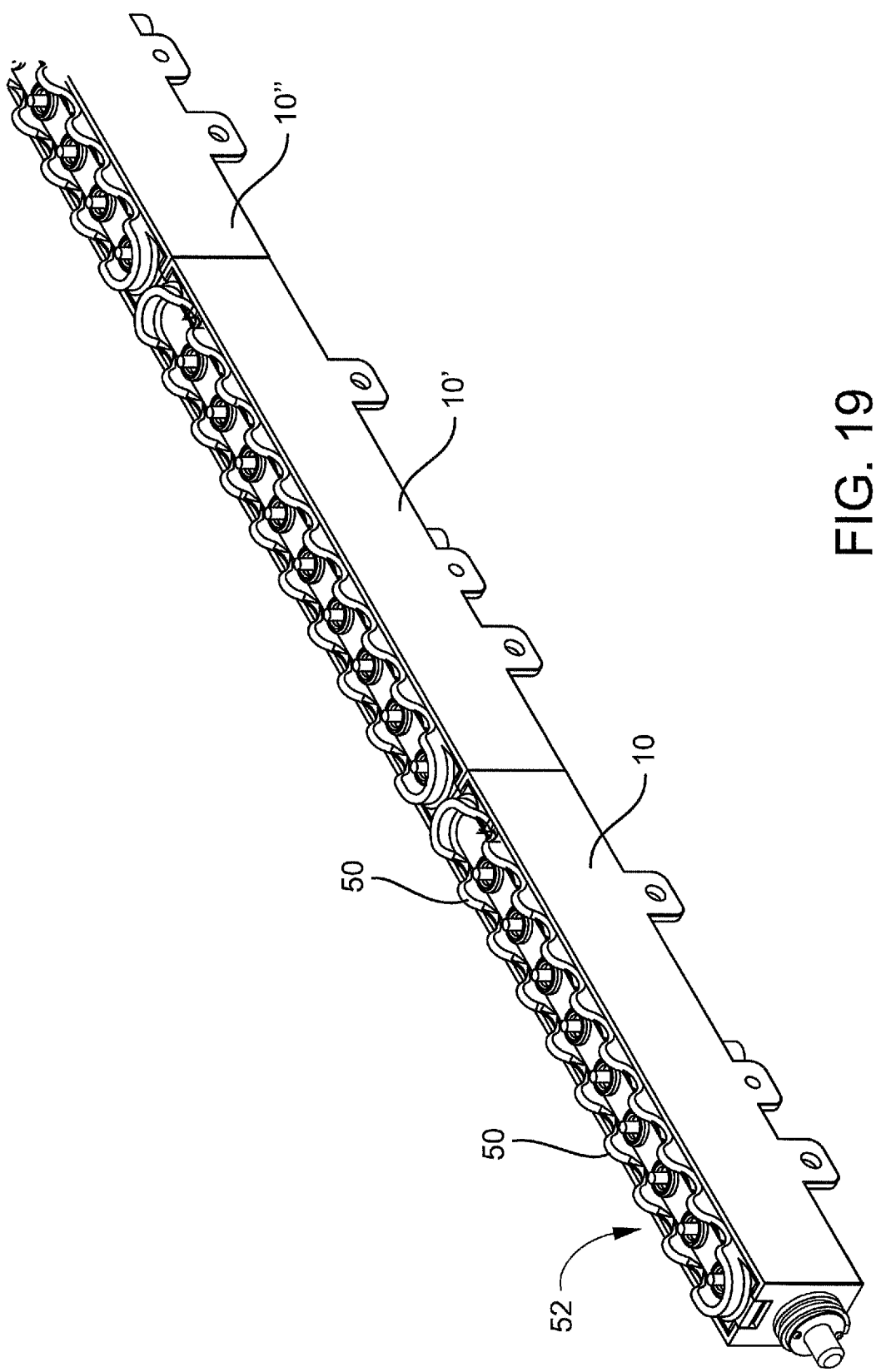
FIG. 19 is a perspective view of three modular ion generator devices engaged together.

As illustrated in FIGS. 14-20, two or more devices 10, 10', 10", 10''' may be engaged or selectively secured together. As shown in FIG. 14, a first device 10 and a second device 10' are being mated, engaged, or selectively secured together. The conductive device 34' of a second device 10' is brought towards the receptable 33 of the first device 10. The conductive device 34' of the second device 10' is inserted into the receptable 33 of the first device 10, as shown in FIG. 15. One or both of the devices 10, 10' are rotated, causing the external threads of the collar 30' to be selectively secured, mated, or engaged to the internal threads of the receptacle 33. As shown in FIGS. 16 and 17, the first device 10 is rotated causing the external threads of the collar 30' of the second device 10' to be selectively secured, mated, or engaged to the internal threads of the receptacle 33 of the first device 10, until the first device 10 and second device 10" are selectively secured, mated, or engaged together as shown in FIG. 18. FIG. 19 illustrates three devices 10, 10', and 10''' selectively secured, mated, or engaged together. FIG. 20 illustrates four devices 10, 10', 10", and 10''' selectively secured, mated, or engaged together, wherein the first device 10 is engaged to the power head 70.

As mentioned above, the power head 70 is a power supply for providing electricity to the device 10, and specifically, the electricity flows from the power head 70 to the conductive device 34 of the device 10. The electricity flows through the conductive device 34 to the first electrical connector 64 that is engaged or coupled to the conductive device 34. The electricity then flows through the first electrical connector 64 and into the printed circuit board 42 and then to the electrodes 26. When two or more devices are selectively secured, mated, or engaged, the electricity flows through the printed circuit board 42 of the first device 10, with a portion of the electricity flowing to the electrodes 26 of the first device 10. The remaining electricity flows to the second electrical connector 66, through the receptacle 33, and into the conductive device 34' of the second device 10'. This flow of electricity continues through each device 10, 10', 10", etc. that are selectively secured, mated, or engaged together.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An ion generator device, comprising:
   a housing comprising a front end and a back end;
   a cavity formed within the housing;
   a plurality of openings positioned along the housing;

an externally threaded collar extending outwardly from the front end;

at least one electrode extending from the housing; and a conductive device disposed within the collar and an internally threaded receptacle within the back end containing a conductive element for allowing one or more modular ion generator devices to be selectively secured to each other.

2. The ion generator device of claim 1, wherein one or more modular ion generator devices are selectively engaged to one another.

3. The ion generator device of claim 1, further comprising a magnet positioned on the device for selectively securing the device to a metal surface.

4. The ion generator device of claim 1, further comprising a plurality of ridges adjacent the electrodes.

5. The ion generator device of claim 1, where the electrodes may be removable.

6. The ion generator device of claim 1, where the electrodes may be constructed of carbon fiber brushes, stainless steel or any other conducting type material.

7. An ion generator device, comprising:

a housing comprising a bottom portion that extends to an outer edge, two opposed side portions that extend upward from the outer edge, a front end that extends upward from the outer edge, a back end that extends upward from the outer edge, and a top portion;

a cavity formed within the two opposed side portions, front end, and back end;

a plurality of openings disposed on the top portion;

a plurality of electrodes positioned within the cavity;

an externally threaded collar extending outwardly from the front end; and a conductive device disposed within the collar and an internally threaded receptacle within the back end containing a conductive element for allowing one or more ion generator devices to be selectively secured to each other.

8. The ion generator device of claim 7, further comprising a power head engaged to the modular ion generator device.

9. The ion generator device of claim 7, further comprising a magnet positioned on the device for selectively securing the device to a metal surface.

10. The ion generator device of claim 7, further comprising at least one flange extending from the device for engaging a magnet thereto.

11. The ion generator device of claim 7, further comprising at least one nipple extending from the top portion.

12. The ion generator device of claim 7, where the at least one electrode may be constructed of carbon fiber brushes, stainless steel or any other conducting type material.

13. The ion generator device of claim 7, further comprising a plurality of ridges adjacent the electrodes.

14. The ion generator device of claim 7, wherein four fingers extend from the front end of the housing.

* * * * *